United States Patent [19]

Janhonen et al.

[11] Patent Number: 6,023,618
[45] Date of Patent: Feb. 8, 2000

[54] METHOD FOR IMPROVING CHARGING CRITERIA IN A MOBILE TELEPHONE NETWORK

[75] Inventors: Risto Janhonen, Kirkkonummi; Markku Tuohino, Espoo; Erkki Ojala, Veikkola, all of Finland

[73] Assignee: Nokia Telecommunications Oy, Espoo, Finland

[21] Appl. No.: 08/860,881

[22] PCT Filed: Dec. 20, 1995

[86] PCT No.: PCT/FI95/00692

§ 371 Date: Jun. 23, 1997

§ 102(e) Date: Jun. 23, 1997

[87] PCT Pub. No.: WO96/20570

PCT Pub. Date: Jul. 4, 1996

[30] Foreign Application Priority Data

Dec. 23, 1994 [FI] Finland ..................... 946091

[51] Int. Cl.⁷ .................................. H04Q 7/22
[52] U.S. Cl. ......................... 455/406; 455/456
[58] Field of Search .................. 455/406, 456, 455/457, 414, 428, 461, 462

[56] References Cited

U.S. PATENT DOCUMENTS

| | | |
|---|---|---|
| 5,216,703 | 6/1993 | Roy ............................ 379/59 |
| 5,295,180 | 3/1994 | Vendetti et al. ............ 379/59 |
| 5,406,616 | 4/1995 | Bjorndahl ................... 455/414 |
| 5,579,379 | 11/1996 | D'Amico et al. .......... 379/112 |
| 5,619,552 | 4/1997 | Karppanen et al. ....... 379/60 |
| 5,691,973 | 11/1997 | Ramstrom et al. ........ 370/58.2 |
| 5,699,407 | 12/1997 | Nguyen ...................... 455/462 |
| 5,740,538 | 4/1998 | Joyce et al. ............... 455/456 |
| 5,784,442 | 2/1996 | Foti ............................ 455/461 |
| 5,787,354 | 2/1994 | Gray et al. ................. 455/456 |

FOREIGN PATENT DOCUMENTS

| | | | |
|---|---|---|---|
| 501 009 | 10/1994 | Sweden ............ | H04Q 7/04 |
| 2 272 607 | 5/1994 | United Kingdom | H04Q 7/04 |
| 93/18606 | 9/1993 | WIPO ............... | H04M 11/00 |
| WO94/05126 | 3/1994 | WIPO ............... | H04Q 7/04 |

*Primary Examiner*—Reinhard J. Eisenzopf
*Assistant Examiner*—Duc Nguyen
*Attorney, Agent, or Firm*—Cushman Darby & Cushman, IP Group of Pillsbury Madison & Sutro LLP

[57] ABSTRACT

The charging criteria for determining the price for a call between two subscribers in a cellular mobile telephone network, is improved. One cell, or a group consisting of several cells, is chosen as a group of special cells. Upon establishing a call, a mobile switching center of a calling subscriber analyzes whether the location cell of the calling subscriber and/or that of the called subscriber are members of a group of special cells. If this is the case, the charging criteria determined for the group will be applied. Additionally, private branch exchanges may also be connected to the mobile switching center.

10 Claims, 2 Drawing Sheets

METHOD FOR IMPROVING CHARGING CRITERIA IN A MOBILE TELEPHONE NETWORK

BACKGROUND OF THE INVENTION

1. Field of the Invention

This invention relates to charging criteria used in a mobile telephone network for determining a price for a call between two subscribers.

2. Description of Related Art

In a fixed telephone network, a calling subscriber is aware of the charging criteria for the call already upon dialing the number of a subscriber B, as charging depends on whether it is a question of a local call, a long-distance call or an international call. In PBX exchanges (Private Branch Exchange) connected to a fixed telephone network, or in PABX networks internal calls are free of charge. In cordless PBX's, part of the subscriber lines are replaced with a radio connection. In cordless PBX's, there are both fixed and cordless extensions. Cordless PBX's thus allow the users of cordless telephones mobility, which depends on the coverage area of cordless base stations. A coverage area typically covers the indoor premises of an office building.

In mobile telephone networks, which enable a high degree of mobility, the charging criteria used in a fixed network cannot be used as such owing to the structure and the mode of operation of the network. In the following, the structure and the operation of a mobile telephone network will be illustrated by means of a prior art GSM mobile telephone network shown in FIG. 1. Communication between a mobile station MS located within a cell, and the network takes place over the radio path via a base transceiver station (BTS). Base transceiver stations are connected to a base station controller (BSC), whose tasks include e.g. management of radio channels, as well as changeover procedures. One base station controller BSC thus controls a number of base stations BTS. The location of a mobile station is known with the accuracy of a so-called location area (LA) composed of a few cells. A mobile station may move within the location area without a need to update the location information related to it. A plurality of base station controllers are connected to one mobile switching centre MSC, which performs the main switching functions of the mobile telephone network. The area of the cells controlled by the mobile switching center is termed as an MSC area, and all the calls originating or terminating within this area are switched via this MSC. Furthermore, the MSC connects the mobile telephone network to external networks.

The mobile telephone network also contains data bases of different kinds. In a Home Location Register (HLR), subscriber data is permanently stored regardless of the current location of the subscriber. The HLR contains the MSISDN number of the subscriber, the International Mobile Subscriber Identity code IMSI to be used inside the network, the subscriber service data, and routing information on a Visitor Location Register VLR. The Visitor Location Register VLR is integrated to all present MSC's, and it is used for recording the subscriber data obtained from the HLR for the duration of the visit of the subscriber to the area of the VLR. The VLR contains the subscriber's IMSI, MSISDN, subscriber service data, and the location area identification LAI that has been used by the subscriber for updating the location information. The location of the subscriber is thus known with the accuracy of a location area.

In the following, call establishment in a mobile telephone network will be disclosed for understanding the charging criteria: When a subscriber switches on his mobile station MS e.g. in cell A (FIG. 1), it signals an updating request to a base station, which request is directed to a mobile switching centre MSC1, and further to a visitor location register VLR. The request searches an IMSI from a home location register HLR. Thereafter, once it has been made sure in the signalling between the VLR and the mobile station that the IMSI is correct, the VLR sends an update request to the HLR, which will send the subscriber data to the VLR. Now the location of the subscriber is updated, i.e. the HLR knows the address of the VLR, and the VLR knows in which location area LAI the subscriber is located.

When a subscriber A calls a subscriber B located in a location area 22 of a second mobile switching center MSC2, he dials the MSISDN number of subscriber B into his mobile station. Signaling phases taking place after this are indicated with ringed numbers in FIG. 1, followed by the number to be switched in the phase in question. Indication MAP, TUP/ISUP represents the protocol to be used in the signaling in question. Next, mobile station MS-A sends base station 1 a message containing the dialed number, phase 1. When MSC1 receives the message, it analyses it and checks whether the request may be accepted. As a part of the check, the subscriber data of subscriber A is searched from the VLR of the MSC1, said data being recorded in connection of the above-mentioned location updating. If the request is accepted, MSC1 will send an interrogation message to the HLR, said message containing the MSISDN number of the mobile station of subscriber B, phase 2. On the basis of this number, the HLR searches the data on subscriber B, the data containing the address of the current VLR of subscriber B. Next the HLR asks the VLR to provide a roaming number by sending information IMSI to it, phase 3, whereafter the VLR sends the roaming number MSRN to the HLR, phase 4. The roaming number MSRN is sent from the HLR to MSC1, phase 5. Thereafter, it is possible to route the call from MSC1 to MSC2 on the basis of the roaming number MSRN received from the VLR, phase 6. The mobile switching center MSC2 of subscriber B asks the VLR incorporated into it for the subscriber data on subscriber B. The subscriber data indicates the location area LAI of subscriber B, so that MSC2 is able to send a paging message via the base station controller 2 in question (phase 7) to cells f, g, and h in the location area. Once the mobile station MS-B of subscriber B has answered the paging, a call will be established all the way to subscriber B. It must be noted that only after the mobile station of subscriber B has answered the paging message, mobile switching center MSC2 knows the location of subscriber 2 on the accuracy of one cell.

In the mobile telephone network described above, all the cells are of an equal value as far as the price of the call is concerned. In mobile telephone networks, the price of a call is based on whether it is a question of a call between a mobile station and a terminal equipment of a fixed network, or a mobile-to-mobile call. Owing to the mobility of mobile stations, the main criterion for charging is to charge subscriber A for the connection between him and the home network of subscriber B, and to charge subscriber B for the connection between his current location and his home network. This is considered fair as in accordance with the call establishment described above, neither the calling subscriber nor the first mobile switching center knows the location of subscriber B, i.e. in which cell subscriber B is located when the call establishment is started.

For increasing the flexibility of the charging criteria, it is possible to set a special charging parameter, which will make it possible to apply a lower tariff to the calls made from the number related to the parameters during off-peak times, and correspondingly, a higher tariff than normally during the peak times. This parameter will make the charging criterion time-dependent, but, in other respects, the charging will follow the above-mentioned principles.

When the charging criterion of mobile telephone networks described above are compared with those of the fixed network, a few problems arise. Since all the cells are equal from the point of view of the mobile telephone network, no other charging criteria may be offered to different groups of users but the flexibility based on the time of the day. The distance between the calling and the called subscriber, or the location of the called subscriber cannot be taken into account in real time when determining the charging criteria. Special charging criteria are not available for certain intra-cell calls or for certain inter-cell calls.

SUMMARY OF THE INVENTION

An object of this invention is to provide a method for improving the charging criteria, and to solve the above-mentioned problems.

In the method of the invention, one cell or a group consisting of several cells is chosen as a group of special cells. Upon establishing a call, the MSC of the calling subscriber analyses whether the location cell of the calling subscriber and/or that of the called subscriber are members of the group of special cells. If that is the case, the charging criteria determined for the group will be applied. In addition, private branch exchanges (PBX) may also be connected to a mobile switching center. PBX subscribers may be taken into account for the digit analysis of the MSC e.g. by determining a separate numbering block for PBX subscribers in the numbering space of the MSC.

In accordance with a preferred embodiment, when the location cell of the calling subscriber and that of the called subscriber are not situated within the area of the same MSC, the information on the location cell of the called subscriber will be transmitted to the MSC of the calling subscriber.

In accordance with a preferred embodiment, such a group of subscribers is also defined, which consists of subscriber numbers between which calls are charged on the basis of the special criteria, taking into account the number and the location cell of the calling subscriber and/or the called subscriber.

DESCRIPTION OF THE DRAWINGS

In the following, the invention will be disclosed in greater detail with reference to the attached drawings, in which.

DESCRIPTION OF THE PREFERRED EMBODIMENTS

Figure 1:
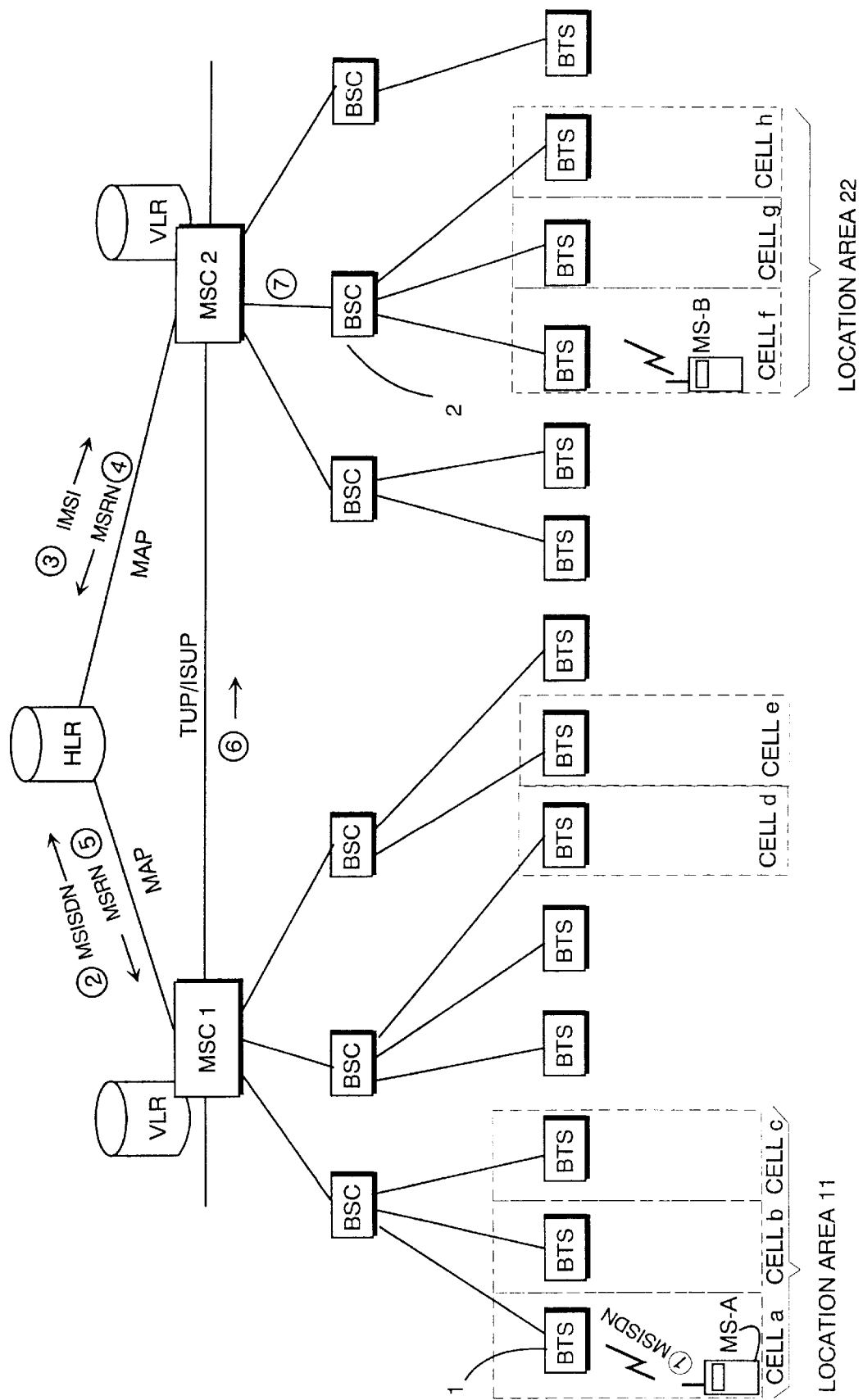
FIG. 1 shows the structure of a prior art mobile telephone network but as discussed below, reference to FIG. 1 is made with respect to the present invention.

Reference is still made to FIG. 1. In accordance with the invention, cells a, c, d and e are chosen as the group of special cells. Separate charging criteria may be determined for intracell and inter-cell calls within this group.

Cells a and c are located within the same location area, and cells d and e are both located within separate location areas. The base station controllers of the base stations of the cells, however, are connected to the same mobile switching center MSC1, to which the information has been recorded on which cells form the group of special cells. Suppose that a calling subscriber is located in cell a, and the called subscriber in cell d. In accordance with call establishment set out above, MSC1 receives the information on the number and the location cell of subscriber A once the mobile station of the subscriber has sent a call setup message. MSC1 checks whether the location cell a of subscriber A is a member of the group of special cells, and detects this is the case. The MSC receives the information on the location cell of subscriber B once the mobile station of subscriber B has answered the paging message sent to its location area, whereafter the MSC will check whether the location cell d of subscriber B is a member of the group of special cells. If it is detected that the location cell of either of the subscribers or the location cells of both subscribers belong to the group of special cells, the charging criteria determined for the group of special cells will be applied.

When it is desirable to limit the subscriber numbers to which the charging criteria of the group of special cells may be applied, a restricted group of subscribers is determined. It is a list of subscriber numbers. When a call is being established, the mobile switching center MSC1 of subscriber A will find out by means of a charging criteria analysis during the call establishment disclosed above what is the relation of the numbers of subscribers A and B to the restricted group of subscribers, and what is the relation of the location cell of the subscribers to the group of special cells. An individual charging criterion may be determined for each possible combination. The number of combinations may be limited in such a way that only if both the number of either of the subscribers or both the subscribers belongs to the restricted group of subscribers and the location cell of either of the subscribers or both the subscribers belongs to the group of special cells, individual charging criteria will be applied. The numbers of the group of subscribers may also be chosen on the basis of the Private Numbering Plan (PNP).

The cells belonging to the group of special cells may be distributed in the areas of several MSC's. Let us define, in addition to the above-mentioned cells a, c, d and e, cell f in location area 22 of MSC2 to the group of special cells, FIG. 1. In both MSC's, information is recorded on which cells form the group of special cells. Assume that the calling subscriber is located in cell a and the called subscriber is located in cell f of MSC2. In accordance with call establishment set out above, MSC1 receives the information on the number and the location cell of subscriber A once the mobile station of the subscriber has sent a call setup message. MSC1 checks whether the location cell a of subscriber A is a member of the group of special cells and detects this is the case. In accordance with call establishment set out above, MSC2 receives the information on the location cell of subscriber B once the mobile station MS-B of subscriber B has answered the paging message sent in its location area 22. In order that the mobile switching center MSC1 of the calling subscriber could take into account upon determining the charging criterion whether the location cell f of subscriber B is a member of the group of special cells, MSC1 must know the location cell of subscriber B before a call is connected between the subscribers. Thus, special charging criteria may be applied in real-time to internal calls of the group of special cells, to calls originating from the group and to calls terminating in the group already from the beginning of the call. The information on the location cell is transmitted in an appropriate message in a manner disclosed hereinafter, said message being used for signaling of the network between mobile switching centers.

The information to be transmitted from MSC2 to the MSC1 of the calling subscriber on the location cell of subscriber B may be just an information on the location cell which has been found out after the mobile station MS-B of subscriber B has answered the paging message sent within its location area. In such a case, MSC1 first analyzes on the basis of the information received on the location cell whether the location cell of subscriber B is a member of the group of special cells, and thereafter determines the charging criterion.

Alternatively, it is possible to carry out an analysis for finding out whether the location cell of subscriber B belongs to the group of special cells or not. This may be carried out already in MSC2. In that case, the information on the location cell to be transmitted to the mobile switching center MSC1 of the calling subscriber is the result of said analysis, and MSC1 may immediately utilize the received result for determining the charging criterion.

In a case where the calling or the called subscriber is a PBX subscriber, it is possible to determine the PBX subscriber a virtual cell to be used when it is necessary to take a PBX subscriber into account when determining the charging criteria. This virtual cell information, or information related to charging is of no importance to the radio system. Virtual cell information may also be applied to a PSTN subscriber. When it is a question of a subscriber in a PABX or a PSTN network, the virtual cell information may be stored in the mobile switching center to which these networks are connected.

Everything that has been said about the case where a group of special cells is located within the area of one MSC is also applicable as such to a case in which the cells of the special group are distributed in the areas of several MSC's. It is thus possible to form a restricted group of subscribers, to use a private number etc.

In the following, ways of transmitting information on the location cell from one MSC to another will be disclosed. Information may be transmitted in a prior art message in accordance with signalling employed between mobile switching centers, or a separate message may be created for it.

Information on the location cell of subscriber B may be added to an Address Complete message, which is sent by the MSC of subscriber B to the MSC of the calling subscriber after a successful paging of subscriber B. Alternatively, information on the location cell of subscriber B may be added to an Answer message, which is sent by the mobile switching center of subscriber B to the mobile switching centre of the calling subscriber in response to that subscriber B has answered the call. The location cell information attached to the answer message may also be used to confirm or cancel a previous information on the location cell, obtained in an Address Complete message.

When a PABX or a PSTN subscriber/subscribers are participating in a call, the above-mentioned messages or other prior art signalling messages are used for transmitting the cell information from the MSC of the called subscriber to the MSC of the calling subscriber. It is also possible to create a separate message for that purpose if necessary.

In addition, by utilizing the call setup message sent by the MSC of the calling subscriber to the MSC of subscriber B at the beginning of the call setup, the MSC of the calling subscriber may express to the MSC of the called subscriber its wish to receive the information on the location cell of subscriber B. This is an alternative for sending the information on the location cell every time.

In ISUP signalling, the Initial Address Message is IAM, Address Complete Message is ACM and Answer Message is ANM. In TUP signalling, the abbreviation for the answer message is ANU (Answer signal, unqualified), ANC (Answer signal, charge), or ANN (Answer signal, no charge).

Figure 2:
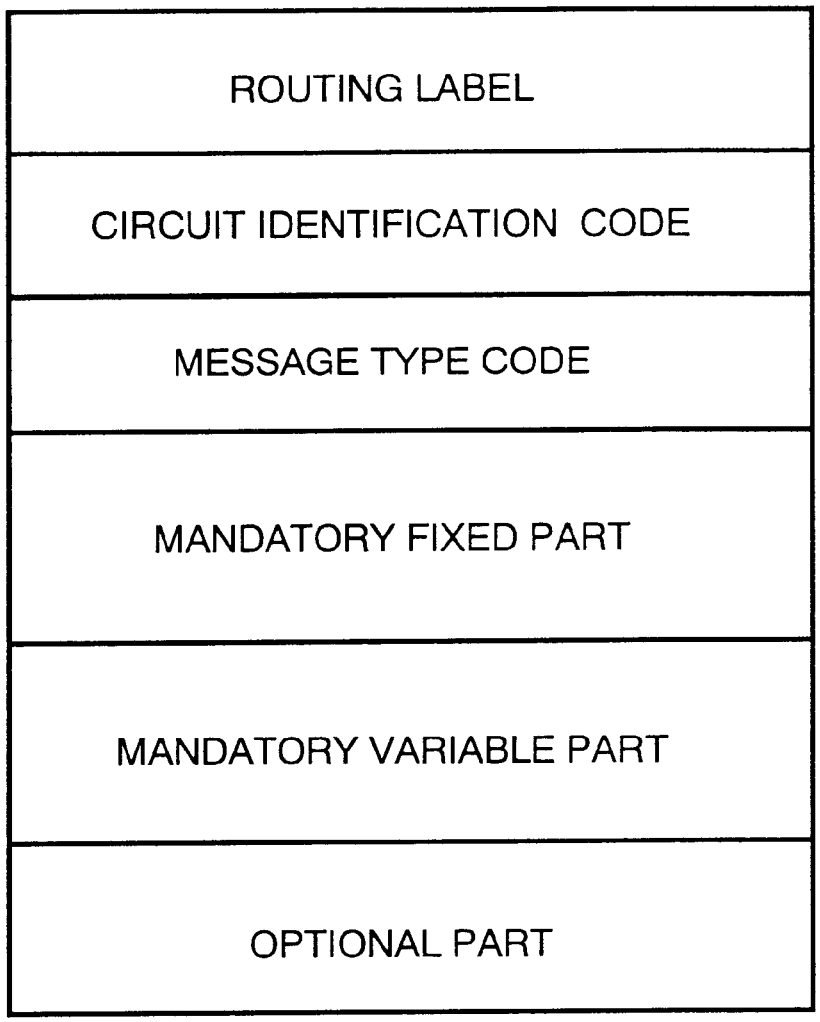
FIG. 2 shows a signaling message in accordance with the ISUP standard.

The format of the messages used in ISUP signalling is shown in FIG. 2. The information on the location cell of subscriber B may be added to the data field which is to be added to Address Complete Message ACM, e.g. "Location-number". If, again, the information on the location cell is added to the Answer Message ANM, it may be placed in the above-mentioned data field "Location-number" to be added. Depending on the application, other messages may alternatively also be used, such as messages "Call progress" or "Connect".

When TUP signalling is employed, both Address Complete Message ACM and Answer Message ANM should also be modified. This is due to the fact that the standard messages contain no suitable data field for transmitting information on the location cell of subscriber B.

An alternative way to transmit information on the location cell of subscriber B is to create a separate new message suitable for the signalling system used, and to send the message at an appropriate moment of time between Address Complete Message and Answer Message.

Regardless of the way to transmit information on the location cell, the information must arrive at the mobile switching center of the calling subscriber along with the answer message at the latest, so that charging would have sufficient time for utilizing the information on the location cell of subscriber B.

With the method of the invention, it is possible to implement a "wireless office" system, where the location cells of various geographically distant units of a community, company, etc. form a group of special cells.

The above explanation and the figures associated therewith are only intended to illustrate the present invention. Different variations and modifications of the invention will be obvious to a person skilled in the art without deviating from the scope and the spirit of the invention set forth in the attached claims.

It is claimed:

1. A method for improving charging criteria in a cellular mobile telephone network, the method comprising:
    defining a group of special cells, the group of special cells including at least one cell of the mobile telephone network;
    defining a special charging criteria for said group of cells;
    transmitting information associated with a location cell of any called subscriber from a mobile switching center of the called subscriber to a mobile switching center of any calling subscriber when the location cell of the calling subscriber and the location cell of the called subscriber are situated within separate mobile switching center areas;
    determining at a call setup of a call whether the location cell of at least one of the subscribers participating in the call belongs to said group of special cells; and
    applying said special charging criteria in real time during the call when the location cell of the at least one subscriber is a member of said group of special cells.

2. A method as claim in claim 1, further comprising:
    forming a restricted subscriber group, each subscriber of the restricted group having a different number;
    determining whether the subscriber number of a subscriber participating in the call belongs to the restricted subscriber group; and applying the specially defined charging criterion to a call in which at least one of the subscribers is a member of the group of special cells and/or the subscriber number of at least one of the subscribers belongs to the restricted subscriber group.

3. A method as claimed in claim 2, wherein each number in the restricted subscriber group is a private number, whereby the private number of the called subscriber will be converted into a telephone number at the beginning of call setup.

4. A method as claimed in claim 1 or 2, wherein an exchange or part of a public switched telephone (PSTN)/integrated services digital (ISDN) network is set as a virtual cell, and when the subscriber number analysis of at least one of the subscribers indicates that the subscriber is a subscriber of the exchange or the part of said PSTN/ISDN network, the special charging criteria will be applied.

5. A method as claimed in claim 1, further comprising forming a new message for transmitting the information on the location cell of the called subscriber.

6. A method for improving charging criteria in a cellular mobile telephone network, the method comprising:

defining a group of special cells, the group of special cells including at least one cell of the mobile telephone network;

defining a special charging criteria for said group of cells;

transmitting information associated with a location cell of any called subscriber from a mobile switching center of the called subscriber to a mobile switching center of any calling subscriber when the location cell of the calling subscriber and the location cell of the called subscriber are situated within separate mobile switching center areas, transmitting in response to a request sent by the mobile switching center of the calling subscriber along with a call setup message during a call setup of a call;

determining at the call setup whether the location cell of at least one of the subscribers participating in a call belongs to said group of special cells; and applying said special charging criteria in real time during the call when the location cell of at least one subscriber is a member of said group of special cells.

7. A method for improving charging criteria in a cellular mobile telephone network, the method comprising:

defining a group of special cells, the group of special cells including at least one cell of the mobile telephone network;

defining a special charging criteria for said group of cells;

transmitting information associated with a location cell of any called subscriber from a mobile switching center of the called subscriber to a mobile switching center of any calling subscriber after a mobile station of the called subscriber has answered a paging message, when the location cell of the calling subscriber and the location cell of the called subscriber are situated within separate mobile switching center areas;

determining at a call setup of a call whether the location cell of at least one of the subscribers participating in a call belongs to said group of special cells; and applying said special charging criteria in real time during the call when the location cell of the at least one subscriber is a member of said group of special cells.

8. A method for improving charging criteria in a cellular mobile telephone network, the network comprising:

defining a group of special cells, the group of special cells including at least one cell of the mobile telephone network;

defining a special charging criteria for said group of cells;

transmitting information associated with a location cell of any called subscriber from a mobile switching center of the called subscriber to a mobile switching center of any calling subscriber after the called subscriber has answered a call, when the location cell of the calling subscriber and the location cell of the called subscriber are situated within separate mobile switching center areas;

determining at a call setup of the call whether the location cell of at least one of the subscribers participating in the call belongs to said group of special cells; and applying said special charging criteria in real time during the call when the location cell of the at least one subscriber is a member of said group of special cells.

9. A method for improving charging criteria in a cellular mobile telephone network, the method comprising:

defining a group of special cells, the group of special cells including at least one cell of the mobile telephone network;

defining a special charging criteria for said group of cells;

transmitting information indicating a location cell of any called subscriber from a mobile switching center of the called subscriber to a mobile switching center of any calling subscriber when the location cell of the calling subscriber and the location cell of the called subscriber are situated within separate mobile switching center areas;

determining at a call setup of a call whether the location cell of the called subscriber or the location cell of the calling subscriber belongs to said group of special cells; and applying said special charging criteria in real time during the call when the location cell of at least one of the called and calling subscribers belongs to said group of special cells.

10. A method for improving charging criteria in a cellular mobile telephone network, the method comprising:

defining a group of special cells, the group of special cells including at least one cell of the mobile telephone network;

defining a specific charging criteria for said group of cells;

analyzing by a switching center of any called subscriber at a call setup of a call whether the location cell of the called subscriber belongs to the group of special cells, when a calling subscriber and the called subscriber are situated within separate mobile switching center areas;

transmitting a result of said analysis from the mobile switching center of the called subscriber to a mobile switching center of the calling subscriber;

determining at the call setup whether the location cell of the called subscriber or the location cell of the calling subscriber belongs to said group of special cells; and applying said special charging criteria in real time during the call when the location cell of at least one of the called and calling subscribers belongs to said group of special cells.

* * * * *